March 12, 1957 R. DIEPPA 2,784,698
WALKING AND TRAINING ROD LEASH
Filed March 1, 1956
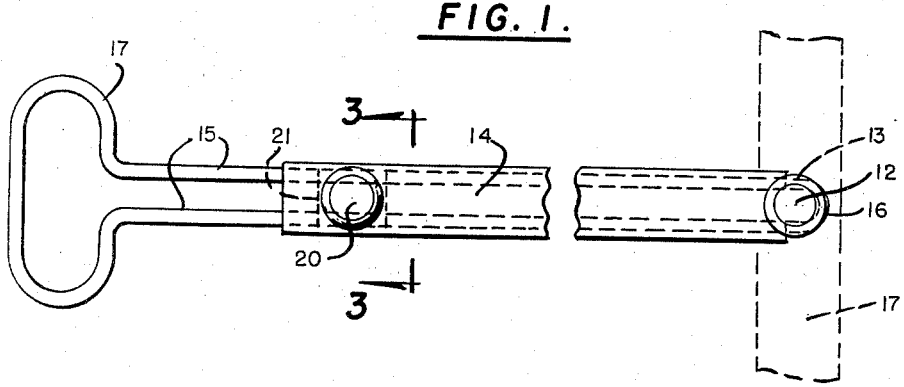
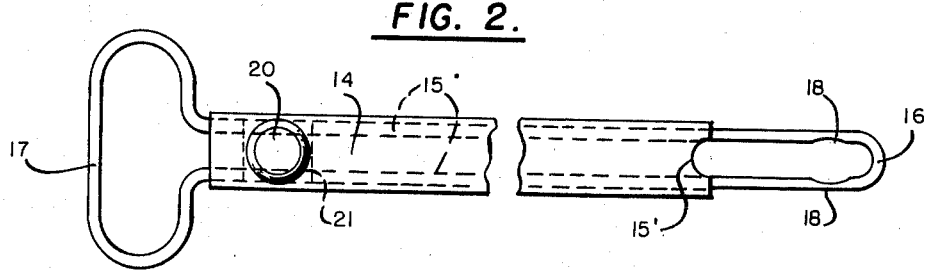
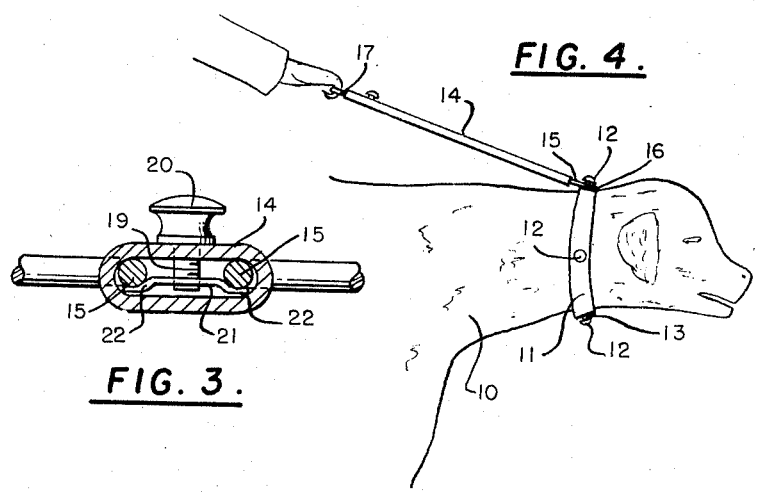
INVENTOR
RALPH DIEPPA

United States Patent Office 2,784,698
Patented Mar. 12, 1957

2,784,698

WALKING AND TRAINING ROD LEASH

Ralph Dieppa, Bronx, N. Y.

Application March 1, 1956, Serial No. 568,925

1 Claim. (Cl. 119—109)

This invention relates to walking and training rods for dogs.

It is an object of the present invention to provide a walking and training rod for dogs or other pets that will prevent the owner from stepping on the pet and which will prevent them from tripping the owner.

It is another object of the present invention to provide a training and walking rod of the above type wherein the dog may be released easily and readily and as easily "re-rodded," without the necessity of bending down.

It is still another object of the present invention to provide a walking and training rod of the above type which will prevent the pet from jumping on the owner once he has been rodded and at the same time will permit him to play away from the owner.

For other objects and for a better understanding of the invention, reference may be made to the following detailed description taken in connection with the accompanying drawing, in which:

Figure 1 is a top plan view of a preferred embodiment of the present invention showing the rod in a locking position relative to the collar;

Fig. 2 is a view similar to Fig. 1 but showing the rod in the pet releasing position;

Fig. 3 is an enlarged transverse sectional view taken along the line 3—3 of Fig. 1; and Fig. 4 is a side elevational view in reduced scale of the invention shown in operative use.

Referring now more in detail to the drawing, 10 represents a pet having the usual collar 11, substantially as illustrated.

In the practice of my invention, four equi-angularly spaced hemispherical knobs 12 are suitably secured to the collar 11 in spaced relationship thereto by means of the narrow neck portions 13 (Fig. 4).

A flattened elongated metallic sleeve 14 of heavy gauge material is provided, being open at both ends, and provided at one end with the arcuate semi-circular cutout 15' adapted to receive therewithin the narrow necks 13 of the knobs 12.

A pair of elongated, laterally spaced parallel rods 15 are slidably received within the sleeve 14, being connected at one end by the semi-circular integrally formed rod portion 16 and at the other end by the laterally enlarged, integrally formed rod or loop formation 17. It will be noted that the rods 15 are of greater length than the sleeve 14 for a purpose which will hereinafter become clear. The rods 15 adjacent the end portion 16 are enlarged laterally, as at 18, to facilitate the passage upwardly therethrough of the knobs 12, as will hereinafter become clear.

The position of the sleeve 14 on the rods 15 is locked by means of an externally threaded stud 19 (Fig. 3) which passes upwardly through an opening in the sleeve 14 and which terminates in an enlarged knob 20 to facilitate rotational movement of the stud. A clamp 21 is screw threaded on the lower end of the stud 19 within the sleeve and terminates in the downwardly offset end portions 22 which engage the underside of the rods 15 and lock the same relative to the sleeve upon locking movement of the knob 20 as will be obvious.

In operation, the end of the rods 15 adjacent the end portion 16 is passed downwardly onto the uppermost of the knobs 12 through the laterally enlarged portions 18 so that the end portion 16 engages one side of the relatively narrow necks 13 of the knobs, as shown in Fig. 4. The sleeve 14, with the knob 20 in the released position is then forced against the other side of the neck 13 below the knobs 12 with the semi-circular cutout 15' engaging the other side of the necks. The sleeve 14 is locked in this position by tightening the knob 20 to draw the bracket or plate 21 upwardly and therewith the downwardly offset end portions 22 whereby to lock the sleeve relative to the rods. This arrangement is shown in Fig. 1. The dog is now in position to be taken for a walk. To release the dog, it is only necessary to unscrew the knob 20 and slide the sleeve 14 away from the end portion 16 and narrow neck 13 whereupon the rods 15 are lifted upwardly by means of the handle portion 16, to permit the knob 12 to pass downwardly therebetween and out of engagement therewith through the laterally enlarged portions 18 of the rods. The dog may again be "rodded" by reversing the above steps.

While various changes may be made in the detail construction, it shall be understood that such changes shall be within the spirit and scope of the present invention as defined by the appended claim.

What I claim as new and desire to protect by Letters Patent of the United States is:

A walking and training rod for dog collars or the like, comprising elongated rigid rod means, handle means at one end of said rod means and releasable means connecting the other end of said rod means with the dog collar or the like, said rigid rod means comprising a pair of laterally spaced, elongated substantially parallel rods having a semicircular portion joining their ends, said handle means comprising a laterally enlarged loop integrally formed at the other ends of said rods and adapted to receive therewithin the hands of the owner, said releasable means comprising an enlarged knob secured to the collar by a relatively narrow neck portion, said rods adjacent said curved portion being enlarged laterally to permit the movement upwardly therethrough of said enlarged knob, an elongated flattened sleeve slidably receiving said rods therethrough at opposite sides, said sleeve at the end adjacent said semicircular portion having a semicircular cutout adapted to be moved against said neck and to secure the same below said knob, and manually operable means carried by said sleeve for locking said sleeve relative to said rods, said last mentioned means comprising a stud passing downwardly through said sleeve intermediate said rods, and an enlarged knob at the upper end of said stud, said stud passing through said sleeve, and a laterally extending clamp plate screw threaded onto the lower end of said stud within said sleeve and terminating in vertically offset end portions adapted to embrace the undersurface of said rods upon rotating said knob.

References Cited in the file of this patent

UNITED STATES PATENTS

| | | |
|---|---|---|
| 712,810 | Knapp | Nov. 4, 1902 |
| 2,337,970 | Cassell | Dec. 28, 1943 |
| 2,652,809 | Foster | Sept. 22, 1953 |
| 2,714,873 | Mosby | Aug. 9, 1955 |

FOREIGN PATENTS

| | | |
|---|---|---|
| 217,183 | Germany | Dec. 18, 1909 |